United States Patent
Kim et al.

(10) Patent No.: US 10,346,514 B2
(45) Date of Patent: Jul. 9, 2019

(54) METHOD OF DISPLAYING WIDGET FOR EXTENDED SERVICE, AND DEVICE FOR PERFORMING THE METHOD

(71) Applicant: KAKAO CORP., Jeju-si, Jeju-do (KR)

(72) Inventors: Yeda Eun Kim, Seoul (KR); Kyoung Won Lee, Seoul (KR); Hye Won Jeong, Seoul (KR)

(73) Assignee: KAKAO CORP., Jeju-si (KR)

( * ) Notice: Subject to any disclaimer, the term of this patent is extended or adjusted under 35 U.S.C. 154(b) by 109 days.

(21) Appl. No.: 15/298,606

(22) Filed: Oct. 20, 2016

(65) Prior Publication Data
US 2017/0109328 A1  Apr. 20, 2017

(30) Foreign Application Priority Data
Oct. 20, 2015  (KR) .................. 10-2015-0145829

(51) Int. Cl.
| | | |
|---|---|---|
| *G06F 3/0484* | (2013.01) | |
| *G06F 17/22* | (2006.01) | |
| *H04W 4/12* | (2009.01) | |
| *G06F 16/955* | (2019.01) | |
| *G06F 16/9535* | (2019.01) | |

(52) U.S. Cl.
CPC ...... *G06F 17/2235* (2013.01); *G06F 3/04842* (2013.01); *G06F 16/9535* (2019.01); *G06F 16/9566* (2019.01); *G06F 17/2247* (2013.01); *H04W 4/12* (2013.01)

(58) Field of Classification Search
CPC .... G06F 3/0484; G06F 17/22; G06F 17/2235; G06F 17/2247
See application file for complete search history.

(56) References Cited

U.S. PATENT DOCUMENTS

| | | | | |
|---|---|---|---|---|
| 2009/0307609 A1* | 12/2009 | Ganz | ................... | G06Q 90/00 715/753 |
| 2014/0173460 A1* | 6/2014 | Kim | ................... | H04L 51/18 715/753 |
| 2016/0142361 A1* | 5/2016 | Grossman | ............... | H04L 51/32 709/206 |

FOREIGN PATENT DOCUMENTS

KR  10-2009-0072144 A  7/2009

OTHER PUBLICATIONS

"Why a Kakaotalk #(sharp) search is needed?", Tistory, Jul. 1, 2015, downloaded from <URL: http://thebetterday.tistory.com/entry/KakaoTalk-Search>—8 pages.

(Continued)

*Primary Examiner* — Andrea C Leggett
(74) *Attorney, Agent, or Firm* — Knobbe Martens Olson & Bear LLP

(57) ABSTRACT

Disclosed is a method and device for displaying a widget for an extended service. The method may include identifying, in a messaging application, link information or summary information of a content page corresponding to the link information, transferring the link information to a message server providing an instant messaging service of the messaging application, receiving, from the message server, widget information to provide an access to an event registered by an entity related to the link information or an extended service applicable to the entity related to the link information among extended services registered in the message server, and displaying a widget based on the widget information.

9 Claims, 12 Drawing Sheets

(56) References Cited

OTHER PUBLICATIONS

"KAKAO # search, and Thumbnail function", Naver Blog, Jul. 3, 2015, downloaded from <URL: http://bbanzz.com/220408484729>—9 pages.
Office Action dated Sep. 23, 2016 of corresponding Korean patent application No. 10-2015-0145829—5 pages.

* cited by examiner

METHOD OF DISPLAYING WIDGET FOR EXTENDED SERVICE, AND DEVICE FOR PERFORMING THE METHOD

CROSS-REFERENCE TO RELATED APPLICATION(S)

This application claims the priority benefit of Korean Patent Application No. 10-2015-0145829 filed on Oct. 20, 2015, in the Korean Intellectual Property Office, the disclosure of which is incorporated herein by reference for all purposes.

BACKGROUND

1. Field

One or more example embodiments relate to a method of displaying a widget for an extended service and a device for performing the method.

2. Description of Related Art

Recently, use of an instant messaging service is increasing as a messaging application that provides such an instant messaging service is installed in almost all user terminals. In the messaging application, various types of information are shared among users, and link information such as a uniform resource locator (URL) is also be frequently used as a target for sharing. In a case where link information is used as a target for sharing, a user participating in a chat room may access a content page corresponding to the link information using the link information shared by a counterpart user participating in the same chat room.

SUMMARY

An aspect provides, when a content page is provided using link information, a method and device for displaying a widget to provide an access to a separate extended service provided by an entity providing an extended service dependent on an instant messaging service or the instant messaging service.

Another aspect also provides a method and device for displaying a widget to provide an access to an extended service associated with link information or an extended service associated with a content page corresponding to the link information.

Still another aspect also provides a method and device for displaying a widget to provide an access to an extended service associated with link information or an extended service associated with a content page corresponding to the link information, among separate extended services provided by an entity providing an extended service dependent on an instant messaging service or the instant messaging service.

Yet another aspect also provides a method and device for displaying a widget suitable for a user terminal or a user by setting a priority of widgets corresponding to extended services derived from link information or by setting a widget displaying requirement.

A further aspect provides a method and device for displaying a widget to induce a user to an extended service from an instant messaging service based on link information after the link information is identified in a messaging application.

According to an aspect, there is provided a widget displaying method to be performed by a user terminal, the widget displaying method including identifying, in a messaging application, link information or summary information of a content page corresponding to the link information, transferring the link information to a message server providing an instant messaging service of the messaging application, receiving, from the message server, widget information to provide an access to an event registered by an entity related to the link information or an extended service applicable to the entity related to the link information among extended services registered in the message server, and displaying a widget based on the widget information.

The displaying may include displaying the widget along with the content page corresponding to the link information using a browser displaying the content page corresponding to the link information.

The displaying may include displaying the widget along with the link information in the messaging application displaying the link information.

The widget information may be generated based on a result of analyzing the link information or a result of analyzing the content page corresponding to the link information.

The widget information may include an (i) an priority of an extended service or the event, or (ii) displaying requirement of the widget, and the displaying may include displaying the widget based on the extended service or priority of the event, or the widget displaying requirement.

According to another aspect, there is provided a widget displaying method to be performed by a message server, the widget displaying method including receiving, from a user terminal, link information selected in a messaging application, generating widget information to provide an access to an event registered by an entity related to the link information or an extended service applicable to the entity related to the link information among extended services registered in the message server, using a result of analyzing the link information or a result of analyzing a content page corresponding to the link information, and providing the widget information to the user terminal. The user terminal may display a widget using the widget information.

The user terminal may display the widget along with the content page corresponding to the link information using a browser displaying the content page corresponding to the link information.

The user terminal may display the widget along with the link information in the messaging application displaying the link information.

The widget information may include (i) an priority of an extended service or the event, or (ii) displaying requirement of the widget, and the displaying may include displaying the widget based on the extended service or priority of the event, or the widget displaying requirement.

According to still another aspect, there is provided a user terminal to perform a widget displaying method, the user terminal including a processor. The processor may identify, in a messaging application, link information or summary information of a content page corresponding to the link information, transfer the link information to a message server providing an instant messaging service of the messaging application, receive, from the message server, widget information to provide an access to an event registered by an entity related to the link information or an extended service applicable to the entity related to the link information among extended services registered in the message server, and display a widget based on the widget information.

According to yet another aspect, there is provided a message server to perform a widget displaying method, the message server including a processor. The processor may receive, from a user terminal, link information selected in a messaging application, generate widget information to provide an access to an event registered by an entity related to the link information or an extended service applicable to the entity related to the link information among extended services registered in the message server, using a result of analyzing the link information or a result of analyzing a content page corresponding to the link information, and provide the widget information to the user terminal. The user terminal may display a widget using the widget information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
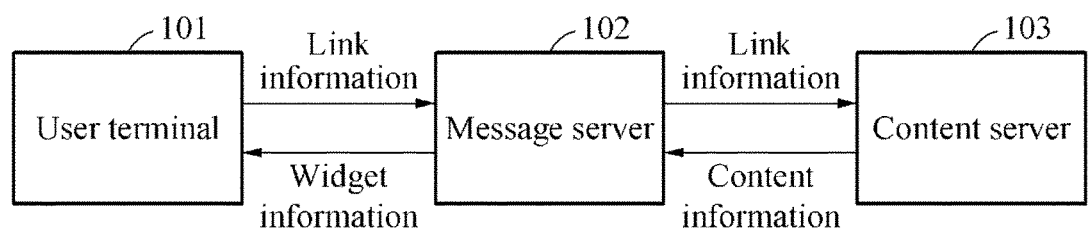
FIG. 1 is a diagram illustrating a relationship among devices performing a widget displaying method according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

After accessing the content page using the link information, the user may simply view contents on the content page, but may not conduct an additional action in association with the content page. Thus, there is a desire for a method of inducing a user to an extended service associated with an instant messaging service after the user accesses a content page using link information shared in a chat room.

FIG. 1 is a diagram illustrating a relationship among devices performing a widget displaying method according to an example embodiment.

A user may select link information such as a uniform resource locator (URL) that is displayed in a messaging application. A content page corresponding to the selected link information may then be displayed using a browser dependent on the messaging application or a browser independent from the messaging application.

For example, referring to FIG. 1, a user of a user terminal 101 may participate in a chat room in a messaging application. The user of the user terminal 101 may have a conversation with a counterpart user of a counterpart terminal participating in the same chat room. Here, a conversation in a form of a text may be forwarded between the user and the counterpart user in the chat room, and also link information such as an URL may be shared between the user and the counterpart user participating in the chat room. The link information may be shared in the chat room when the counterpart user transmits the link information to the user or the user searches, by a keyword, the link information in the chat room.

The link information may then be displayed on a chat window that is displayed in a screen (or display) of the user terminal 101. Alternatively, summary information associated with a content page corresponding to the link information may be displayed in lieu of the link information based on an instant messaging service, although the link information is forwarded from the counterpart user. Alternatively, the link information forwarded from the counterpart user may be displayed along with the link information in the chat room.

The summary information may be derived from a scrap server connected to a message server 102 after the message server 102 hook the link information transferred from the counterpart terminal to the user terminal 101, or derived from the user terminal 101 by transferring the link information transferred from the counterpart terminal directly to the scrap server. The scrap server may extract metadata including a representative image, a description, a title, and the like of the content page from the content page corresponding to the link information, and then transfer the extracted metadata to the message server 102. The messaging application of the user terminal 101 may display, in the chat room, the summary information of the content page corresponding to the link information based on the metadata received from the message server 102.

That is, when the user selects the link information displayed in the chat room of the messaging application, the content page may be provided using a browser that is executed separately from the messaging application.

In addition, when the user selects the link information displayed on another area in lieu of the chat room of the messaging application, the content page may be provided using a browser that is executed separately from the messaging application. For example, the link information may be displayed using an additional service or a certain area of the messaging application, for example, Kakao channel, in lieu of the chat room for the instant messaging service, which is a basic service of the messaging application. Here, the link information may be displayed in a certain area of the additional service, or the summary information of the content page corresponding to the link information may be displayed in the area of the additional service.

When the user selects, in the messaging application, the displayed link information or the summary information of the content page corresponding to the link information, the user terminal 101 may transfer the link information to the message server 102.

In an example, the message server 102 may analyze the link information received from the user terminal 101. The message server 102 may identify an entity, which is an operator providing the content page corresponding to the link information, by analyzing the link information. For example, when the link information includes an URL, for example, www.XXXcom/~~, the entity that is the operator providing the content page may be verified to be XXX. Alternatively, the message server 102 may identify which category the link information belongs to or which category the content page corresponding to the link information belongs to using the link information.

In another example, the message server 102 receiving the link information from the user terminal 101 may analyze the content page corresponding to the link information. That is, the message server 102 may analyze the content page corresponding to the link information, and obtain a result of analyzing the content page, for example, a type of contents included in the content page and a context or details included in the contents.

Such a process of analyzing the content page may be performed by a content server 103, in lieu of the message server 102. The content server 103 may receive the link information from the message server 102, and analyze the content page corresponding to the link information. For example, the content server 103 may analyze an attribute or details of the content included in the content page, or analyze an attribute of the content page, for example, a category of the content page, an inflow path which the content page is introduced, an inflow keyword, and location information mapped to the content page. The content server 103 may then transfer content information, which is the result of analyzing the content page, to the message server 102.

The message server 102 may determine information on a widget to be displayed on the user terminal 101, which is referred to widget information hereinafter, based on at least one of the result of analyzing the link information or the result of analyzing the content page corresponding to the link information.

For example, the message server 102 may identify event information provided by an entity Y providing the content page for a preset period of time. Alternatively, the message server 102 may identify, among a plurality of extended services that is accessible in an instant messaging service of an entity X, at least one extended service that is associated with the entity Y providing the content page corresponding to the link information. In detail, the message server 102 may identify an extended service that the entity Y may subscribe to or may support, among the extended services accessible in the instant messaging service.

The message server 102 may then generate widget information on a widget to be used to induce the user of the user terminal 101 to participate in an event of the entity Y or an extended service of the instant messaging service. Here, the widget may indicate an information providing field to represent information on an extended service in the user terminal 101, and the widget information may refer to information to be used to display the widget on the user terminal 101. Based on the widget information, a type, a form, or details of the widget to be displayed on the user terminal 101 may vary.

The widget information may include information to represent the event, for example, an image associated with the event, duration of the event, information on the entity Y providing the event, and details or promotions of the event, or include information to represent the extended service, for example, an image associated with the extended service, information on the entity Y associated with the extended service, and details of the extended service. The widget information may reflect information on the user selecting the link information, for example, settings or bookmark information, interest information, and characteristic information including a gender, an age, a region, and an age group. The widget information in which the information on the user is reflected may be transferred from a server for the extended service or the event.

Here, when a plurality of events or a plurality of extended services corresponds to the link information, the widget information may include (i) an priority of an extended service or the event, or (ii) displaying requirement of the widget to be included in the widget to be displayed on the user terminal 101. The user terminal 101 may then display the widget using the widget information received from the message server 102. The user terminal 101 may display the widget to provide an access to the event or the extended service to be displayed on the user terminal 101 based on a relationship between the user selecting the link information and the entity Y, for example, a friendship, whether the user selecting the link information subscribes to the extended service, or a category of the content page corresponding to the link information.

Here, the extended service may include a service provided by the entity X operating the instant messaging service providing the chat room in which the link information is shared, or a service provided by another entity being in a cooperative relationship with the entity X. The extended service may be dependent on the instant messaging service and be provided in the messaging application. Alternatively, the extended service may be provided in a service application performing a function different from a function of the messaging application, independently from the instant messaging service.

The service application for the extended service may be installed when the messaging application is installed in the user terminal 101, or installed in the user terminal 101 when an installation link displayed on a portion of the messaging application is selected.

The message server 102 may generate the widget to be displayed on the user terminal 101 based on at least one of the result of analyzing the link information or the result of analyzing the content page corresponding to the link information. The user terminal 101 may then display the widget generated by the message server 102. Here, although a plurality of events or extended services is derived based on the link information, the message server 102 may generate the widget to be displayed on the user terminal 101 based on information on a relationship between the entity Y providing the content page corresponding to the link information and the user terminal 101.

The user terminal 101 may receive the widget information from the message server 102 and generate the widget.

Alternatively, the user terminal 101 may receive the widget generated by the message server 102. The user terminal 101 may then display the widget along with the content page corresponding to the link information using a browser when displaying the content page corresponding to the link information. The browser may include an in-app browser connected to the messaging application and an out-app browser unrelated to the messaging application.

Alternatively, the user terminal 101 may display the widget in the chat room of the messaging application in which the link information is shared, irrespective of displaying the content page corresponding to the link information using the browser. In a case of displaying the widget in the chat room, the widget may be displayed in a form of a speech bubble in the chat room of the messaging application or displayed in another template different from the speech bubble. Concisely, the user terminal 101 may display the widget along with the link information in the messaging application displaying the link information.

Here, when the widget displayed on the user terminal 101 is selected by the user, the user terminal 101 may display a service page of the extended service corresponding to the widget or a guidance page of the event corresponding to the widget. Alternatively, when the widget displayed on the user terminal 101 is selected by the user, the service page corresponding to the widget or the guidance page may not be displayed, but a server associated with the extended service or the event may operate or perform a function based on the widget.

Thus, when the user selects the link information shared in the chat room of the messaging application or a certain area for an additional service, the user terminal 101 may display a widget for an event or an extended service associated with an entity associated with the link information based on a result of analyzing the link information or a result of analyzing a content page corresponding to the link information. Using the widget, the user may be provided with an opportunity to access the event or the extended service.

Concisely, when link information provided based on a basic service such as an instant messaging service is selected, a content page corresponding to the link information may be displayed using a browser. Here, based on a result of analyzing the link information or a result of analyzing the content page, a widget corresponding to an extended service from the basic service or an event registered by an entity related to the link information may be displayed on a browser displaying the content page or in a messaging application to which the link information is provided.

Although the instant messaging service is described herein as the basic service, any type of a basic service that may provide the link information may be used as the basic service. For example, when link information displayed on a post provided in a social network service (SNS) is selected, a content page corresponding to the link information may be displayed using a browser and a widget that may provide an access to an extended service of the SNS, which is the basic service, or an event registered by an entity related to the link information may be displayed.

Figure 2:
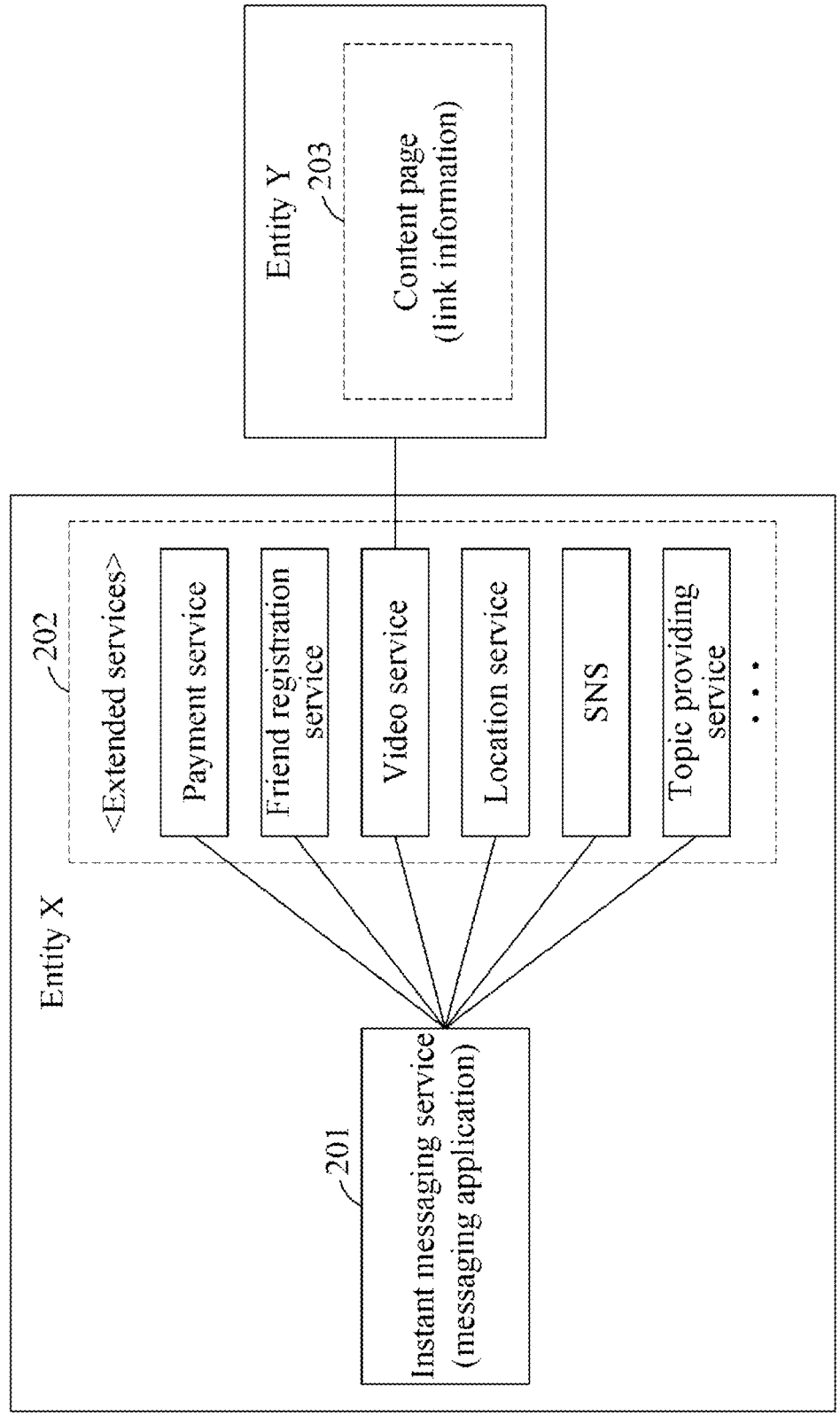
FIG. 2 is a diagram illustrating a relationship between an instant messaging service and an extended service according to an example embodiment.

FIG. 2 is a diagram illustrating a relationship between an instant messaging service and an extended service according to an example embodiment.

Referring to FIG. 2, an instant messaging service 201 may be provided by an entity X, which is an operator. A user terminal may receive the instant messaging service 201 in a messaging application provided by the entity X. Here, it is assumed that link information such as an URL is shared between a user of the user terminal and a counterpart user participating in a chat room of the instant messaging service 201. It is also assumed that the link information includes the URL that may link the user or the counterpart user to a content page 203 provided by the entity X providing the instant messaging service 201 or by another entity Y.

Here, when the user participating in the chat room in the messaging application selects the link information, the user terminal may transfer the link information to a message server.

When the link information displayed on another area in lieu or the chat room of the messaging application for the instant messaging service 201, the content page 203 may be provided using a browser to be executed separately from the messaging application. For example, the link information may be displayed in an additional service or a certain area of the messaging application, for example, Kakao channel, in lieu of the chat room for the instant messaging service 201, which is a basic service of the messaging application. In a certain area of the additional service, the link information may be displayed, or the summary information of the content page 203 corresponding to the link information may be displayed.

The message server may then analyze the link information itself, or analyze the content page 203 corresponding to the link information. By analyzing the link information or the content page 203 corresponding to the link information, the message server may generate widget information for an event registered in the message server by the entity Y related to the link information, or for an extended service associated with the entity Y related to the link information among extended services 202 registered in the message server, for example, a payment service, a friend registration service, a video service, a location service, an SNS, and a topic providing service.

When a plurality of events and a plurality of extended services 202 correspond to the link information, the widget information may include an (i) an priority of an extended service or the event, or (ii) displaying requirement of the widget. The user terminal may then display the widget using the widget information received from the message server.

Here, the extended service may include a service provided by the entity X operating the instant messaging service 201 or by another entity being in a cooperative relationship with the entity X. The extended service may be dependent on the instant messaging service 201 and provided in the messaging application. Alternatively, the extended service may be provided based on a service application performing a function different from a function of the messaging application, independently from the instant messaging service 201.

The service application for the extended service may be installed in the user terminal along with the messaging application when the messaging application is installed in the user terminal, or installed in the user terminal when an installation link displayed on an area of the messaging application is selected.

The user terminal may then generate a widget based on the widget information generated by the message server. The user terminal may generate the widget based on the (i) an priority of an extended service or the event, or (ii) displaying requirement of the widget.

The user terminal may display the widget to provide an access to the event or the extended service to be displayed on the user terminal based on the widget displaying requirement, for example, a relationship between the user selecting the link information and the entity Y, for example, a friendship, whether the user selecting the link information subscribes to the extended service, or a category to which the content page 203 corresponding to the link information belongs.

That is, the user terminal may determine the widget to be displayed on the user terminal by sequentially comparing the events or the extended services 202 to information on the user terminal and the widget displaying requirement based on the order of the priorities.

The user terminal may receive the widget information from the message server and generate the widget. The user terminal may then display the widget along with the content page 203 corresponding to the link information using the browser when displaying the content page 203 corresponding to the link information. The browser may include an in-app browser connected to the messaging application or an out-app browser unrelated to the messaging application.

Alternatively, the user terminal may display the widget in the chat room of the messaging application in which the link information is shared, independently from displaying the content page 203 corresponding to the link information using the browser. In such a case of displaying the widget in the chat room, the widget may be displayed in a form of a speech bubble in the chat room of the messaging application, or displayed in another template different from the speech bubble. That is, the widget may not be displayed using the browser, but displayed along with the link information in the messaging application displaying the link information.

For example, the widget may be displayed on the user terminal concurrently with the content page 203, or displayed on the user terminal after a certain amount of time elapses after the content page 203 is displayed.

Figure 3:
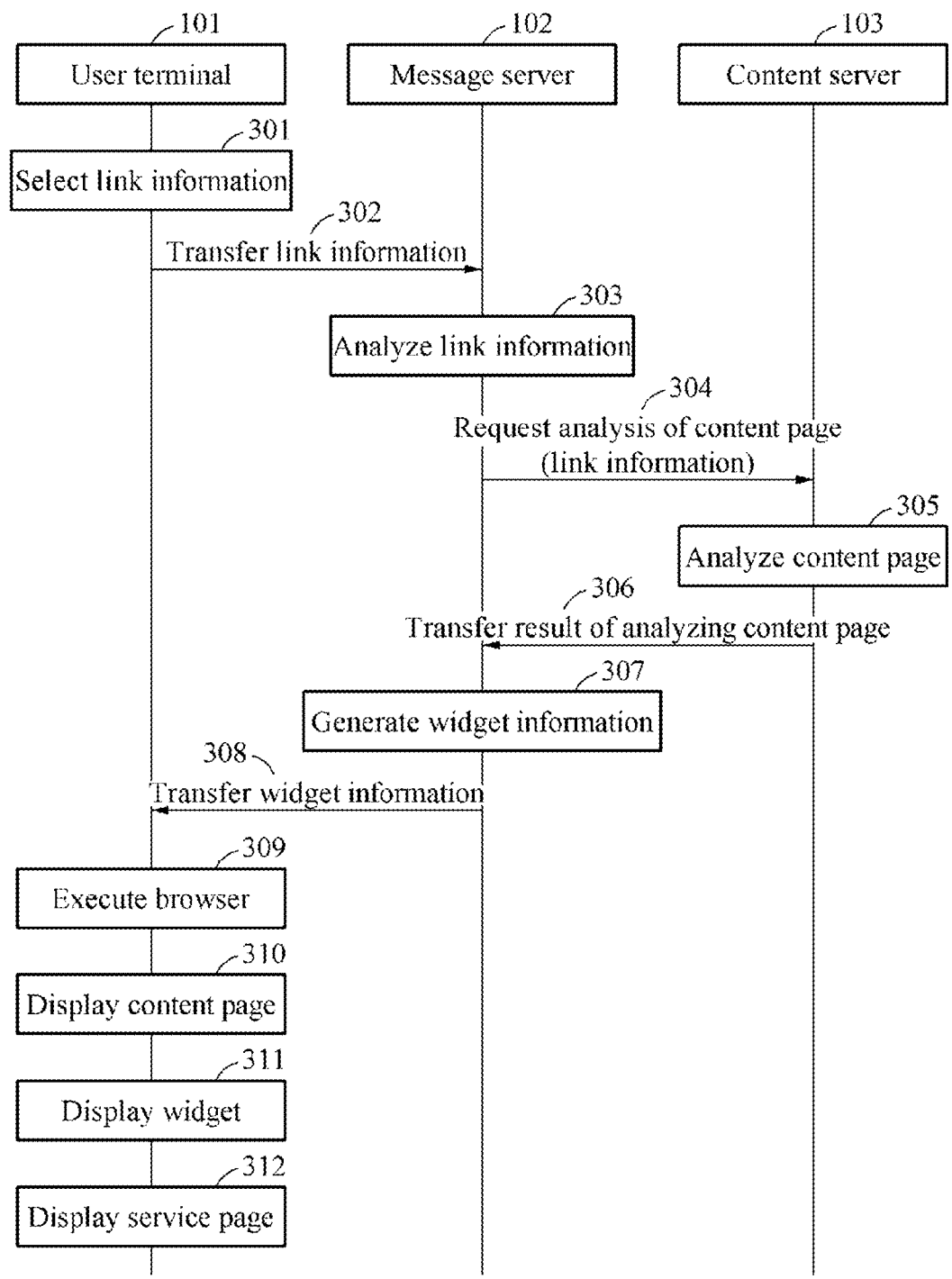
FIG. 3 is a diagram illustrating a flow of a widget displaying method according to an example embodiment.

FIG. 3 is a diagram illustrating a flow of a widget displaying method according to an example embodiment.

Referring to FIG. 3, a user terminal 101 may access a chat room in a messaging application. A user of the user terminal 101 may exchange dialogues with a counterpart user accessing the same chat room, and share link information such as an URL with the counterpart user. In the chat room, the link information may be displayed, summary information of a content page corresponding to the link information may be displayed, or the link information and the summary information may be displayed together.

Alternatively, the link information may be displayed on another area in lieu of the chat room of the messaging application. For example, the link information may be displayed using an additional service or a certain area of the messaging application, for example, Kakao channel, in lieu of the chat room for an instant messaging service, which is a basic service of the messaging application. In such an example, in a certain area of the additional service, the link information may be displayed or the summary information of the content page corresponding to the link information may be displayed.

In stage 301, the user may select the link information or the summary information of the content page corresponding to the link information that is displayed in the chat room of the messaging application or on another area in lieu of the chat room.

In detail, the user may select the link information transferred from the counterpart user in the chat room or the summary information of the content page corresponding to the link information. The link information may indicate an URL shared in the chat room in which the user participates. Alternatively, the user may select the link information provided in the additional service in lieu of the instant messaging service of the messaging application, or the summary information of the content page corresponding to the link information.

In stage 302, the user terminal 101 may transfer the link information to a message server 102. In stage 303, the message server 102 may analyze the link information transferred from the user terminal 101. For example, the message server 102 may identify an entity based on the link information by analyzing the link information. The message server 102 may then identify an event registered, in the message server 102, by the entity related to the link information. Alternatively, the message server 102 may identify an extended service applicable to the entity related to the link information among a plurality of extended services associated with the instant messaging service.

The message server 102 may analyze the content page corresponding to the link information, in addition to analyzing the link information itself. That is, the message server 102 may analyze the content page corresponding to the link information, and obtain a result of analyzing the content page, for example, a type of contents included in the content page, a context or details of the contents, location information mapped to the content page, and an extended service that may be mapped to the content page.

Here, a content server 103 present outside of the message server 102 may analyze the content page corresponding to the link information, in lieu of the message server 102. In such a case, the message server 102 may transfer, to the content server 103, the link information along with a request for the analysis of the content page in stage 304. In stage 305, the content server 103 may analyze the content page corresponding to the link information received from the message server 102. The content server 103 may identify the extended service that may be mapped to the content page among the extended services registered in the message server 102 based on the result of analyzing the content page. In stage 306, the content server 103 may transfer the result of analyzing the content page to the message server 102.

In stage 307, the message server 102 may generate widget information using at least one of the result of analyzing the link information or the result of analyzing the content page corresponding to the link information. In detail, the message server 102 may generate the widget information to allow the user of the user terminal 101 to participate in an event of the entity related to the link information or an extended service from the instant messaging service.

As described with reference to FIG. 2, a widget may induce a user to access an extended service provided by an entity X providing an instant messaging service or by another entity being in a cooperative relationship with the entity X, for example, a payment service, a friend registration service, a video service, a location service, an SNS, and a topic providing service.

In stage 308, the message server 102 may transfer the widget information to the user terminal 101. Here, when a plurality of events or extended services corresponds to the link information, the widget information may include (i) an priority of an extended service or the event, or (ii) displaying requirement of the widget. That is, a widget suitable for the user terminal 101 may be determined to be displayed by comparing, to the widget displaying requirement, the events or the extended services, sequentially starting from an event or an extended service with a highest priority.

The widget displaying requirement may be a requirement indicating whether the widget is displayable based on a situation of the user terminal 101 or the user of the user terminal 101. For example, the widget displaying requirement may include information as to whether the user subscribes to the entity corresponding to the link information and whether the user subscribes an extended service associated with the widget information, and information on a relationship between the entity related to the link information and the user, for example, a friendship, duration of the widget being displayed, and a location at which the widget is to be displayed.

In stage 309, the user terminal 101 may execute a browser when the link information is selected. The browser may include an in-app browser associated with the messaging application or an out-app browser independent from the messaging application.

In stage 310, the user terminal 101 may display the content page corresponding to the link information using the browser. In stage 311, the user terminal 101 may display the widget simultaneously when the content page is displayed or display the widget after a certain amount of time elapses after the content page is displayed. The widget may be displayed along with the content page using the browser. Alternatively, the widget may be displayed in a form of a speech bubble or another template different from the speech bubble in the chat room of the messaging application, separately from the content page being displayed using the browser. That is, the widget may not be displayed using the browser, but displayed along with the link information in the messaging application displaying the link information.

In stage 312, when the widget is selected, the user terminal 101 may display a service page corresponding to the extended service or the event.

Figure 4:
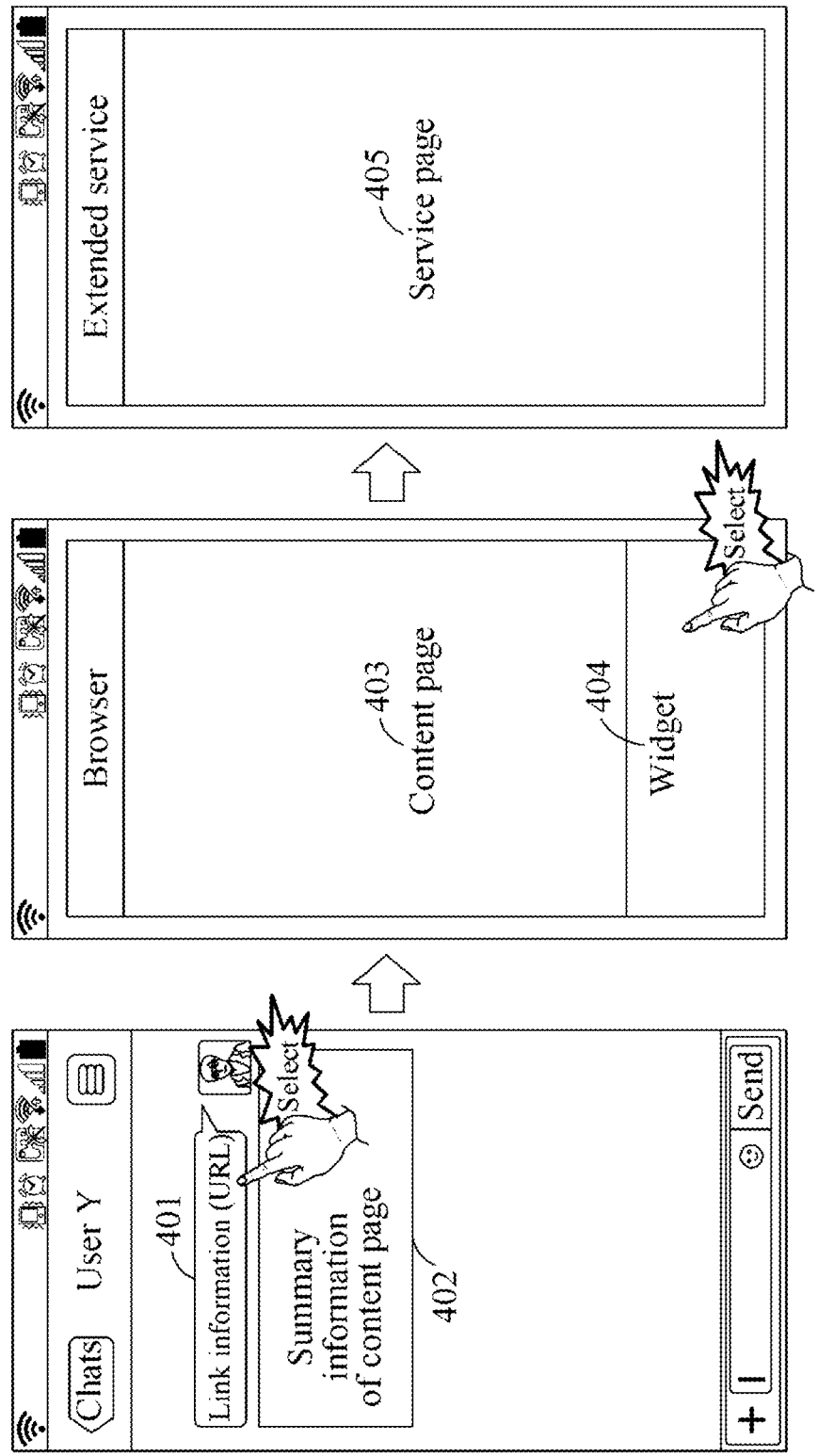
FIG. 4 is a diagram illustrating an example of a method of displaying a widget for an extended service dependently on a content page according to an example embodiment.

FIG. 4 is a diagram illustrating an example of a method of displaying a widget for an extended service dependently on a content page according to an example embodiment.

A left portion of FIG. 4 illustrates a chat room accessed by a user in a messaging application being executed in a user terminal of the user. In the chat room, link information 401 such as an URL and summary information 402 of a content page 403 accessible based on the link information 401 are illustrated.

In one example, when the link information 401 is transferred from a counterpart user participating in the chat room, only the link information 401 may be displayed in the chat room. In another example, when the link information 401 is transferred from the counterpart user participating in the chat room, only the summary information 402 of the content page 403 that is obtained from the content page 403 corresponding to the link information 401 may be displayed. In still another example, when the link information 401 is transferred from the counterpart user participating in the chat room, the link information 401 may be displayed along with the summary information 402 of the content page 403 in the chat room.

The summary information 402 of the content page 403 may include a representative image, a title, a description, and the like of the content page 403 and the summary information 402 of the content page 403 may be obtained based on a result of analyzing the content page 403 by a scrap server connected to a message server.

When the user selects one of the link information 401 and the summary information 402 of the content page 403, the user terminal may display the content page 403 corresponding to the link information 401 using a browser as illustrated in a middle portion of FIG. 4. Here, the user terminal may display a widget 404 dependent on the content page 403.

For example, the widget 404 may be used to induce the user to access an extended service provided by an entity X providing an instant messaging service or another entity being in a cooperative relationship with the entity X, for example, a payment service, a friend registration service, a video service, a location service, an SNS, and a topic providing service, or to access an event registered by an entity Y related to the link information 401.

The user terminal may generate the widget 404 based on widget information received from the message server. In such a case, the user terminal may determine the extended service or the event associated with the widget 404 to be displayed based on an order of priorities of extended services and a widget displaying requirement. Alternatively, the user terminal may display the widget 404 generated directly by the message server without a change.

The widget 404 may include information to allow the user to access an event provided by an entity related to the link information 401, an extended service applicable to the entity related to the link information 401 among extended services registered in the message server, or a service page 405 for an extended service matching the content page 403 corresponding to the link information 401.

As illustrated in the middle portion of FIG. 4, when the widget 404 is displayed along with the content page 403 dependently on the content page 403, the widget 404 may be displayed on a certain area of the content page 403, for example, an upper portion, a lower portion, a left portion, a right portion, and a middle portion of a screen of the user terminal.

Alternatively, the widget 404 may be displayed overlapping in an entire area of the content page 403, or displayed in a form popping up from the content page 403. Also, the widget 404 may move along a scrolled screen of the user terminal when the user scrolls the screen of the user terminal, or disappear from the screen. The widget 404 may be fixed at a location at which the widget 404 is initially displayed irrespective of the scrolling of the screen.

The widget 404 may be displayed concurrently with the content page 403 when the content page 403 is displayed, or displayed after a certain amount of time elapses after the content page 403 is displayed. The widget 404 may be maintained continuously while the content page 403 is being displayed, or disappear from the screen automatically or by an additional input from the user after a certain amount of time elapses after the content page 403 is displayed.

When the user selects the widget 404 displayed along with the content page 403 on the screen as illustrated in the middle portion of FIG. 4, the service page 405 associated with the extended service or the event corresponding to the widget 404 may be displayed as illustrated in a right portion of FIG. 4. The service page 405 may refer to a page to be shown when the entity providing the instant messaging service or another entity being in the cooperative relationship with the entity performs the extended service or executes a service application associated with the extended service.

Although the user verifies the content page 403 provided by the entity X in the messaging application of the entity Y providing the instant messaging service, the user terminal may display, along with the content page 403 but independently from the content page 403, the widget 404 that may allow the user to access the extended service provided by the entity Y or another entity being in a cooperative relationship with the entity Y or the service page 405 associated with the service application.

Figure 5:
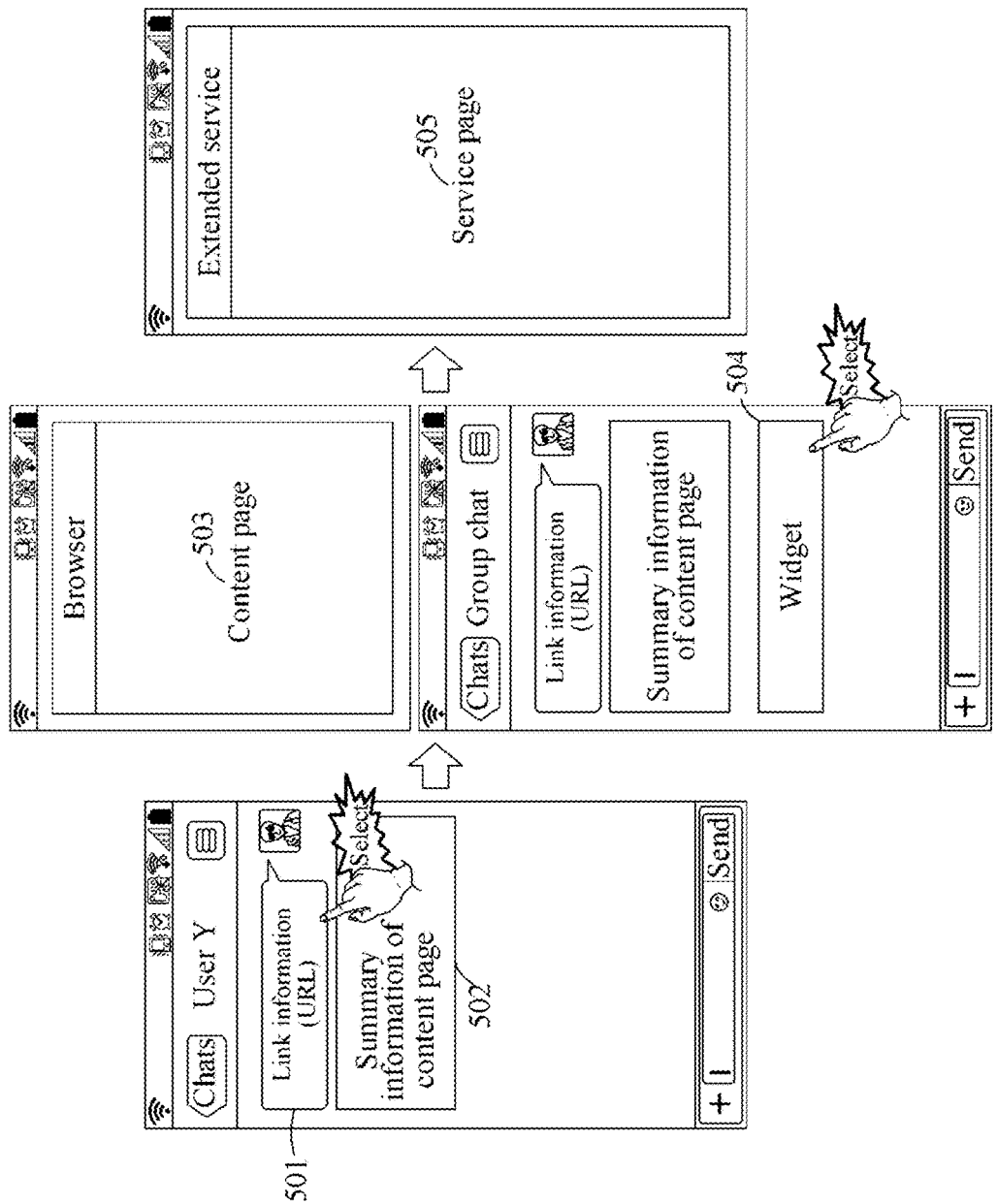
FIG. 5 is a diagram illustrating an example of a method of displaying a widget for an extended service independently from a content page according to an example embodiment.

FIG. 5 is a diagram illustrating an example of a method of displaying a widget for an extended service independently from a content page according to an example embodiment.

Dissimilar to the example illustrated in FIG. 4, FIG. 5 illustrates an example of a method of displaying a widget corresponding to an extended service or an event in a chat room of a messaging application in lieu of a content page. Referring to a left portion of FIG. 5, link information 501 and summary information 502 of a content page 503 corresponding to the link information 501 may be displayed in the chat room of the messaging application.

As described with reference to FIG. 4, when the link information 501 is shared by a counterpart user participating in the same chat room, the chat room may display one of the link information 501 and the summary information 502 of the content page 503, or display both the link information 501 and the summary information 502 of the content page 503.

As illustrated in an upper middle portion of FIG. 5, when a user selects one of the link information 501 and the summary information 502 of the content page 503, a user terminal of the user may display the content page 503 corresponding to the link information using a browser. The user terminal may display a widget 504 in the chat room of the messaging application using a speech bubble or another template different from the speech bubble. That is, the widget 504 may not be displayed using the browser, but displayed along with the link information 501 in the messaging application in which the link information 501 is displayed.

The widget 504 may be obtained by analyzing the link information 501 or the content page 503 corresponding to the link information 501. In detail, the widget 504 may be used to allow the user to access an event of an entity Y related to the link information 501 or an extended service applicable to the entity Y among extended services of an instant messaging service registered in a message server.

Concisely, the widget 504 derived from the link information 501 may not be displayed along with the content page 503, but displayed in the chat room separately from the content page 503.

When the user selects the widget 504, a service page 505 associated with an extended service or an event corresponding to the widget 504 may be displayed as illustrated in a right portion of FIG. 5.

As described above, both the examples illustrated in FIGS. 4 and 5 relate to a case in which link information or summary information of a content page corresponding to the link information is displayed in a chat room. However, the link information or the summary information of the content page may be displayed on a certain area of a messaging application in lieu of the chat room. Here, the area may refer to an area for an additional service in addition to a chat service, which is a basic service of the messaging application.

Thus, example embodiments described herein may be applicable to all the cases in which a user selects the link information displayed in the chat room of the messaging application or on the area in lieu of the chat room, and accesses the content page using a browser.

Figure 6:
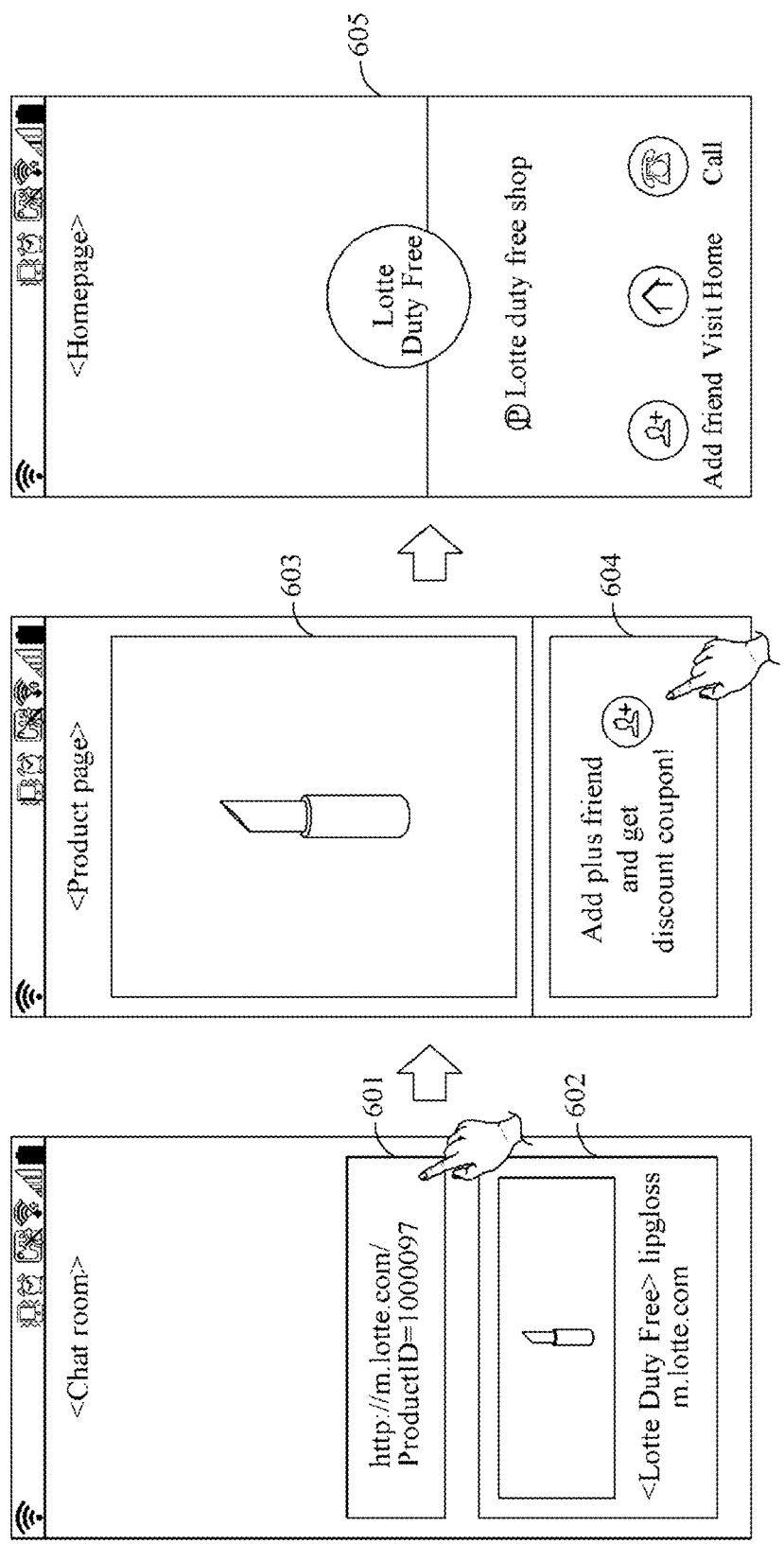
FIG. 6 is a diagram illustrating an example of a method of displaying a widget associated with a friend registration service dependent on an instant messaging service according to an example embodiment.

FIG. 6 is a diagram illustrating an example of a method of displaying a widget associated with a friend registration service dependent on an instant messaging service according to an example embodiment.

Referring to a left portion of FIG. 6, link information 601 may be displayed in a chat room. In addition, summary information 602 of a content page 603 corresponding to the link information 601 may be displayed in lieu of the link information 601, or the link information 601 and the summary information 602 may be displayed together. When a user of a user terminal selects one of the link information 601 and the summary information 602 of the content page 603, the content page 603 may be displayed as illustrated in a middle portion of FIG. 6.

In FIG. 6, it is assumed that the user selects the link information 601 associated with a product selling in a Lotte duty free shop corresponding to an entity Y different from an entity X providing an instant messaging service. The user terminal may then display, along with the content page 603, a widget 604 associated with a friend registration service, for example, Kakao Talk Plus Friend, which is an extended service dependent on the instant messaging service which the user may receive various information messages from a virtual subject, the Lotte duty free shop. Here, the Lotte duty free shop may be an entity registered in the instant messaging service.

Here, when the user does not register the Lotte duty free shop as a friend, the user terminal may display, along with the content page 603, the widget 604 including details to allow the user to add the Lotte duty free shop as a friend. The widget 604 may be displayed, in the chat room of a messaging application illustrated in the left portion of FIG. 6, based on a speech bubble or another template different from the speech bubble, separately from the content page 603.

When the user selects the widget 604 as illustrated in a middle portion of FIG. 6, a service page 605 of the friend registration service corresponding to the widget 604 may be displayed as illustrated in a right portion of FIG. 6. The service page 605 may be a profile page of the Lotte duty free shop for the friend registration service. The user may then register the Lotte duty free shop as a friend, or identify information on the Lotte duty free shop in the service page 605.

According to an example embodiment, a message server may analyze link information, and identify an extended service corresponding to details of the link information. An instant messaging service may then provide a user terminal with a service page which a user of the user terminal may access the extended service or a service page of a service application for the extended service.

Figure 7:
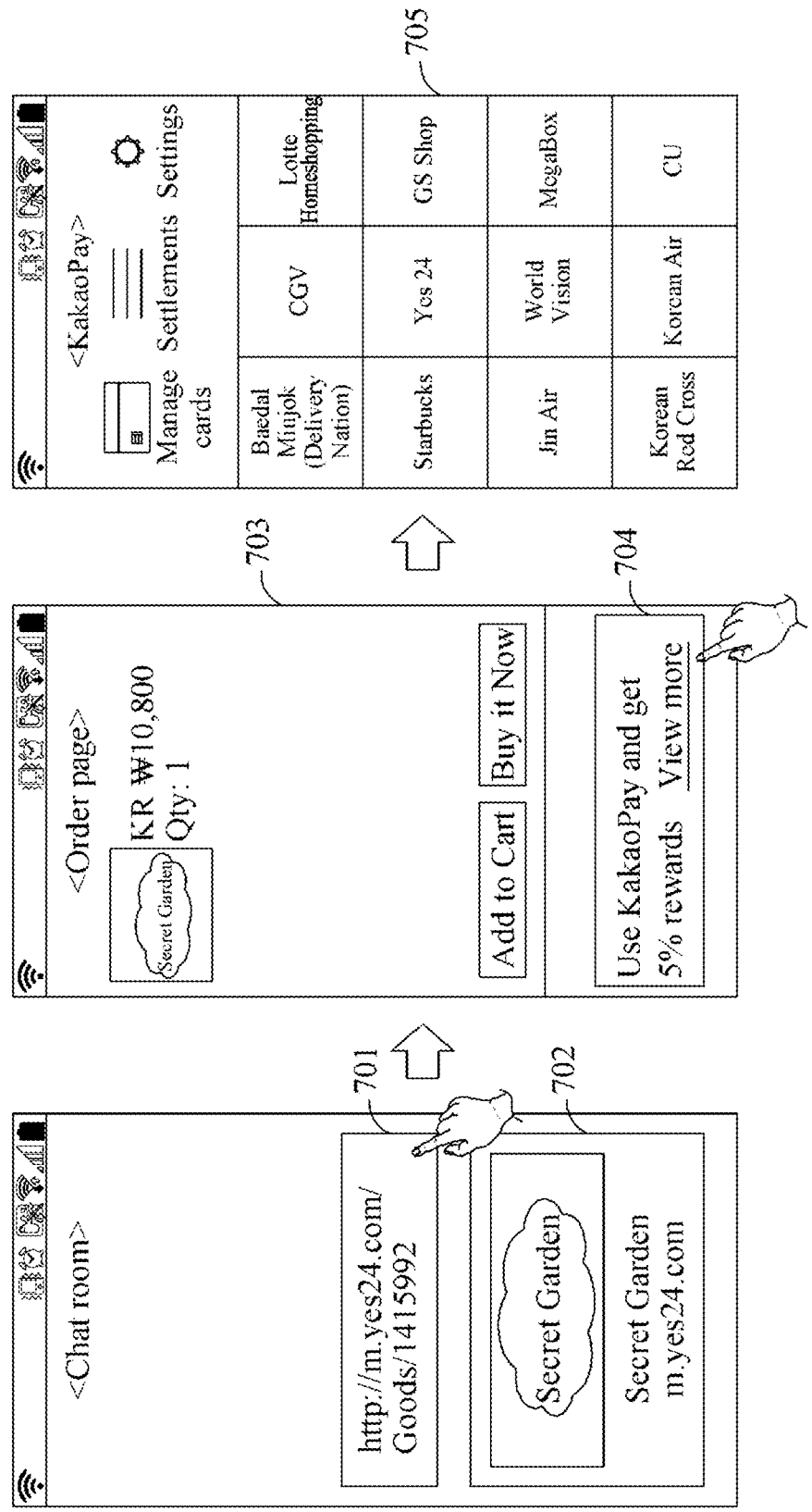
FIG. 7 is a diagram illustrating an example of a method of displaying a widget associated with a payment service according to an example embodiment.

FIG. 7 is a diagram illustrating an example of a method of displaying a widget associated with a payment service according to an example embodiment.

Referring to a left portion of FIG. 7, link information 701 may be displayed in a chat room. In addition, summary information 702 of a content page 703 corresponding to the link information 701 may be displayed in lieu of the link information 701, or the link information 701 and the summary information 702 may be displayed together. When a user of a user terminal selects one of the link information 701 and the summary information 702 of the content page 703, the content page 703 may be displayed as illustrated in a middle portion of FIG. 7.

In FIG. 7, it is assumed that the user selects the link information 701 associated with a payment page for a book selling at an online shopping mall, Yes 24, corresponding to an entity Y different from an entity X providing an instant messaging service. The user terminal may then display, along with the content page 703, a widget 704 associated with a payment service, for example, Kakao Pay, which is an extended service providing a payment method for the payment page. The payment service may refer to an extended service provided by the entity X providing the instant messaging service or another entity being in a cooperative relationship with the entity X.

Here, when the user does not subscribe to the payment service, the user terminal may display, along with the content page 703, the widget 704 including details to allow the user to subscribe to the payment service. The widget 704 may be displayed, in the chat room of a messaging application illustrated in the left portion of FIG. 7, based on a speech bubble or another template different from the speech bubble, separately from the content page 703.

When the user selects the widget 704 as illustrated in a middle portion of FIG. 7, a service page 705 of the payment service corresponding to the widget 704 may be displayed as illustrated in a right portion of FIG. 7. The user may then subscribe to the payment service in the service page 705 by selecting one from various entities supporting the payment service.

The widget 704 may include information associated with various events provided by the shopping mall Yes 24. Here, when the user does not subscribe to the payment service, a widget associated with the payment service may be displayed in preference to a widget associated with an event.

According to an example embodiment, an additional action may be expected from a user by allowing the user to access an extended service suitable for a context of a content page, or a service application.

Figure 8:
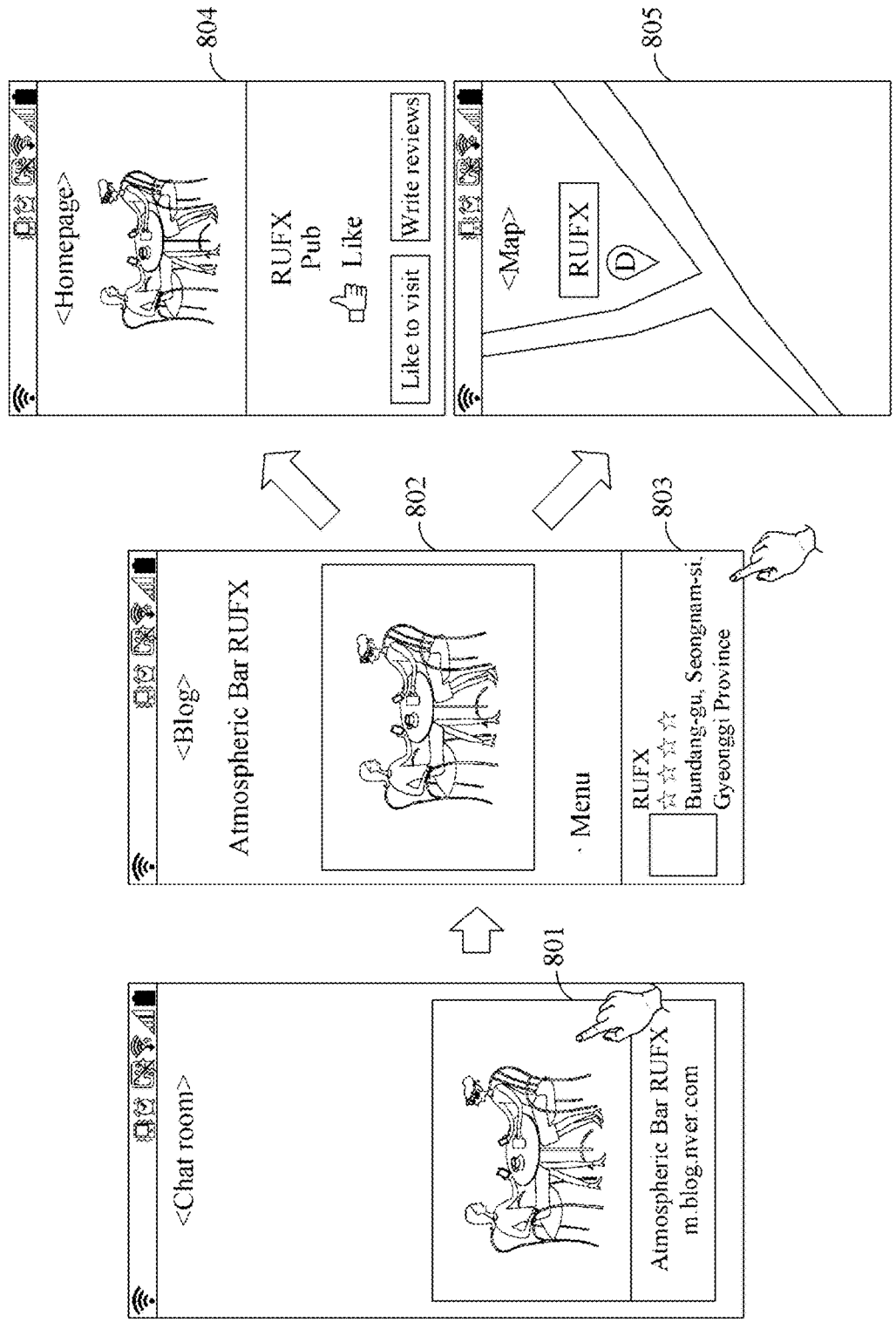
FIG. 8 is a diagram illustrating an example of a method of displaying a widget associated with a location service according to an example embodiment.

FIG. 8 is a diagram illustrating an example of a method of displaying a widget associated with a location service according to an example embodiment.

Referring to a left portion of FIG. 8, link information may be displayed in a chat room. In addition, summary information 801 of a content page 802 corresponding to the link information may be displayed in lieu of the link information, or the link information and the summary information 801 may be displayed together. When a user of a user terminal selects one of the link information and the summary information 801 of the content page 802, the content page 802 may be displayed as illustrated in a middle portion of FIG. 8.

In FIG. 8, it is assumed that the user selects a blog address of an entity Y different from an entity X providing an instant messaging service or the summary information 801 of the content page 802. The user terminal may then display, along with the content page 802, a widget 803 associated with a location service, for example, Kakao Place and Map, related to a specific place in details of the content page 802.

The location service may refer to an extended service provided by the entity X providing the instant messaging service or another entity being in a cooperative relationship with the entity X. A location of the place may be determined based on address information matching an URL allocated to a blog page or address information verified from a name of the place.

The user terminal may then display, along with the content page 802, the widget 803 to connect the user to a service application associated with the location service. The widget 803 may be displayed, in the chat room of a messaging application illustrated in the left portion of FIG. 8, based on a speech bubble or another template different from the speech bubble, separately from the content page 802. The widget 803 may include, for example, brief introduction of a location, and recommendations associated with the location.

When the user selects the widget 803 as illustrated in a middle portion of FIG. 8, a service page 804 or 805 of the location service or a location-based application corresponding to the widget 803 may be displayed as illustrated in a right portion of FIG. 8. The user may then execute the location-based application, which is a service application associated with the location service, based on the widget 803. The user may identify, for example, detailed information of a location posted on the blog page, route information to reach the location, and surrounding information of the location, in the service page 804 or 805 of the location-based application.

According to an example embodiment, convenience may be provided to a user using a widget by reducing a flow of movements of the user having to additionally execute a location-based application to search for a location posted on a blog.

Figure 9:
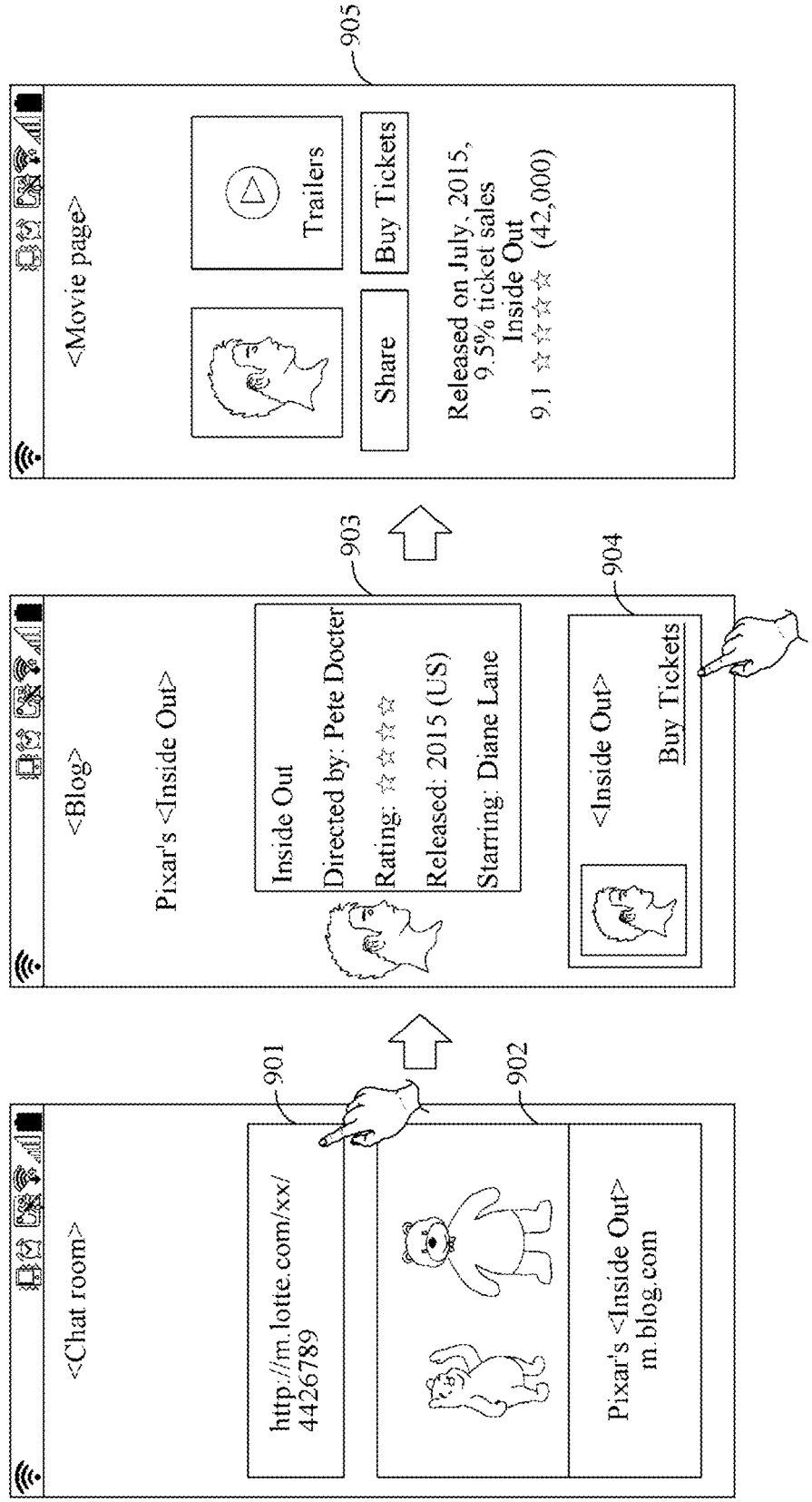
FIG. 9 is a diagram illustrating an example of a method of displaying a widget associated with a movie service according to an example embodiment.

FIG. 9 is a diagram illustrating an example of a method of displaying a widget associated with a movie service according to an example embodiment.

Referring to a left portion of FIG. 9, link information 901 may be displayed in a chat room. In addition, summary information 902 of a content page 903 corresponding to the link information 901 may be displayed in lieu of the link information 901, or the link information 901 and the summary information 902 may be displayed together. When a user of a user terminal selects one of the link information 901 and the summary information 902 of the content page 903, the content page 903 may be displayed as illustrated in a middle portion of FIG. 9.

In FIG. 9, it is assumed that the user selects the link information 901 associated with a blog page of an entity Y different from an entity X providing an instant messaging service, and the blog page includes details of a movie.

The user terminal may then display, along with the content page 903, a widget 904 associated with a movie service, which is an extended service providing information associated with the move or connecting the user to a movie ticket reservation. Here, the movie service may refer to an extended service provided by the entity X providing the instant messaging service or another entity being in a cooperative relationship with the entity X.

The user terminal may then display, along with the content page 903, the widget 904 including details of a state of the movie ticket reservation provided using the movie service associated with the movie described in the blog page and details to induce the user to reserve a ticket for the movie. The widget 904 may be displayed, in the chat room of a messaging application illustrated in the left portion of FIG. 9, based on a speech bubble or another template different from the speech bubble, separately from the content page 903.

When the user selects the widget 904 as illustrated in the middle portion of FIG. 9, a service page 905 of the movie service corresponding to the widget 904 may be displayed as illustrated in a right portion of FIG. 9. The user may then reserve the ticket for the movie, which is provided by the movie service, in the service page 905.

Figure 10:
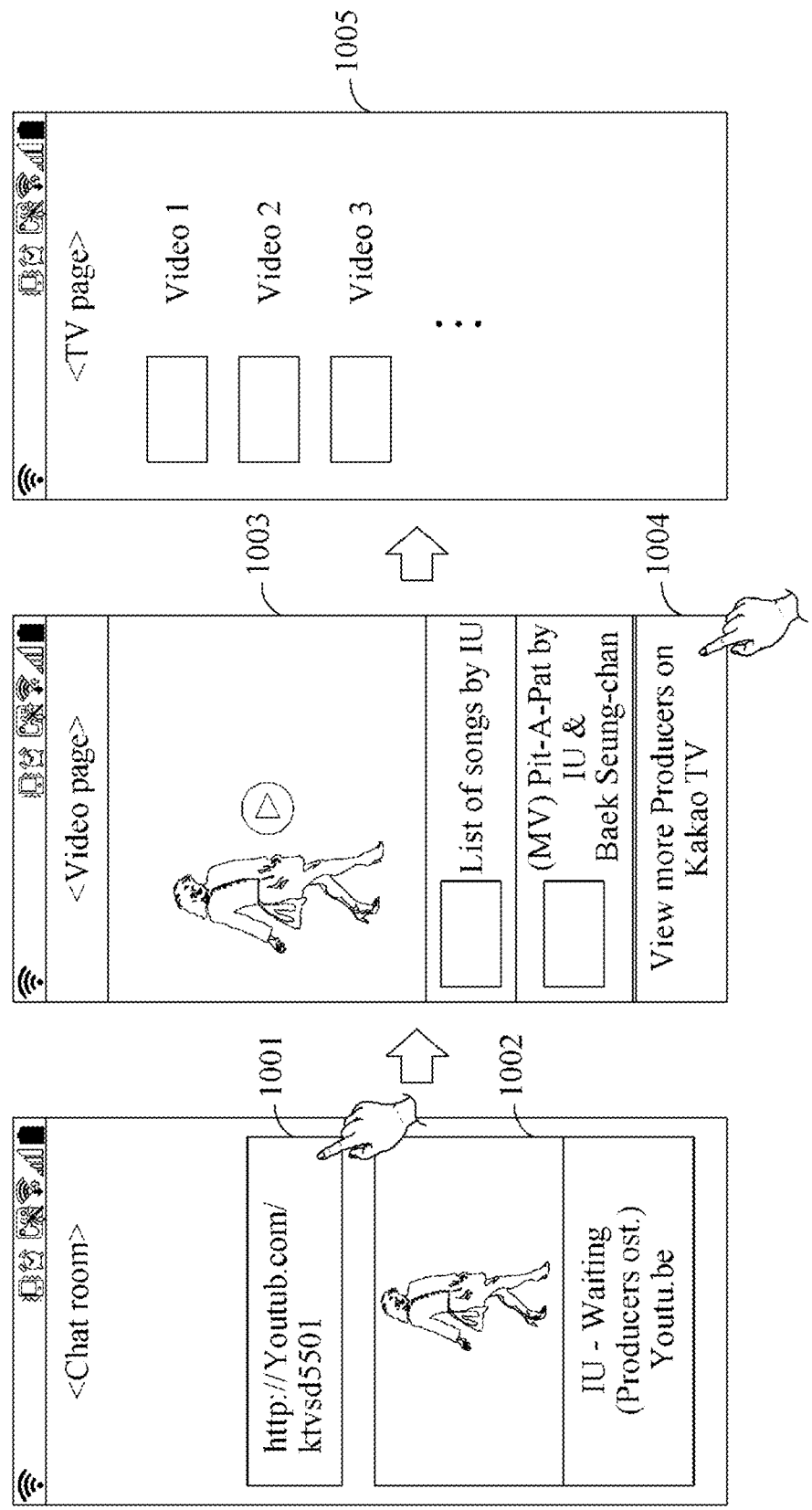
FIG. 10 is a diagram illustrating an example of a method of displaying a widget associated with a video service according to an example embodiment.

FIG. 10 is a diagram illustrating an example of a method of displaying a widget associated with a video service according to an example embodiment.

Referring to a left portion of FIG. 10, link information 1001 may be displayed in a chat room. In addition, summary information 1002 of a content page 1003 corresponding to the link information 1001 may be displayed in lieu of the link information 1001, or the link information 1001 and the summary information 1002 may be displayed together. When a user of a user terminal selects one of the link information 1001 and the summary information 1002 of the content page 1003, the content page 1003 may be displayed as illustrated in a middle portion of FIG. 10.

In FIG. 10, it is assumed that the user selects the link information 1001 associated with a video provided by an entity Y different from an entity X providing an instant messaging service. The user terminal may then display, along with the content page 1003, a widget 1004 associated with a video service, for example, Kakao TV, which is an extended service providing a video or television (TV) contents. Here, the video service may refer to an extended service provided by the entity X providing the instant messaging service or another entity being in a cooperative relationship with the entity X.

The user terminal may then display, along with the content page 1003, the widget 1004 including metadata derived from the video corresponding to the link information 1001, for example, a title, details, a description, a producer, and a copyright holder of the video, and details to induce the user to play another related video or a video edited in the video service irrespective of the link information 1001. The widget 1004 may be displayed, in the chat room of a messaging application illustrated in the left portion of FIG. 10, based on a speech bubble or another template different from the speech bubble, separately from the content page 1003.

When the user selects the widget 1004 as illustrated in the middle portion of FIG. 10, a service page 1005 of the video service corresponding to the widget 1004 may be displayed as illustrated in a right portion of FIG. 10. The user may play another video in the service page 1005 by identifying other videos supported by the video service.

Thus, according to an example embodiment, although a user views a video in a content page unrelated to an entity operating an instant messaging service, the user may be induced to additionally view another video related to the video in a service page associated with the entity.

Figure 11:
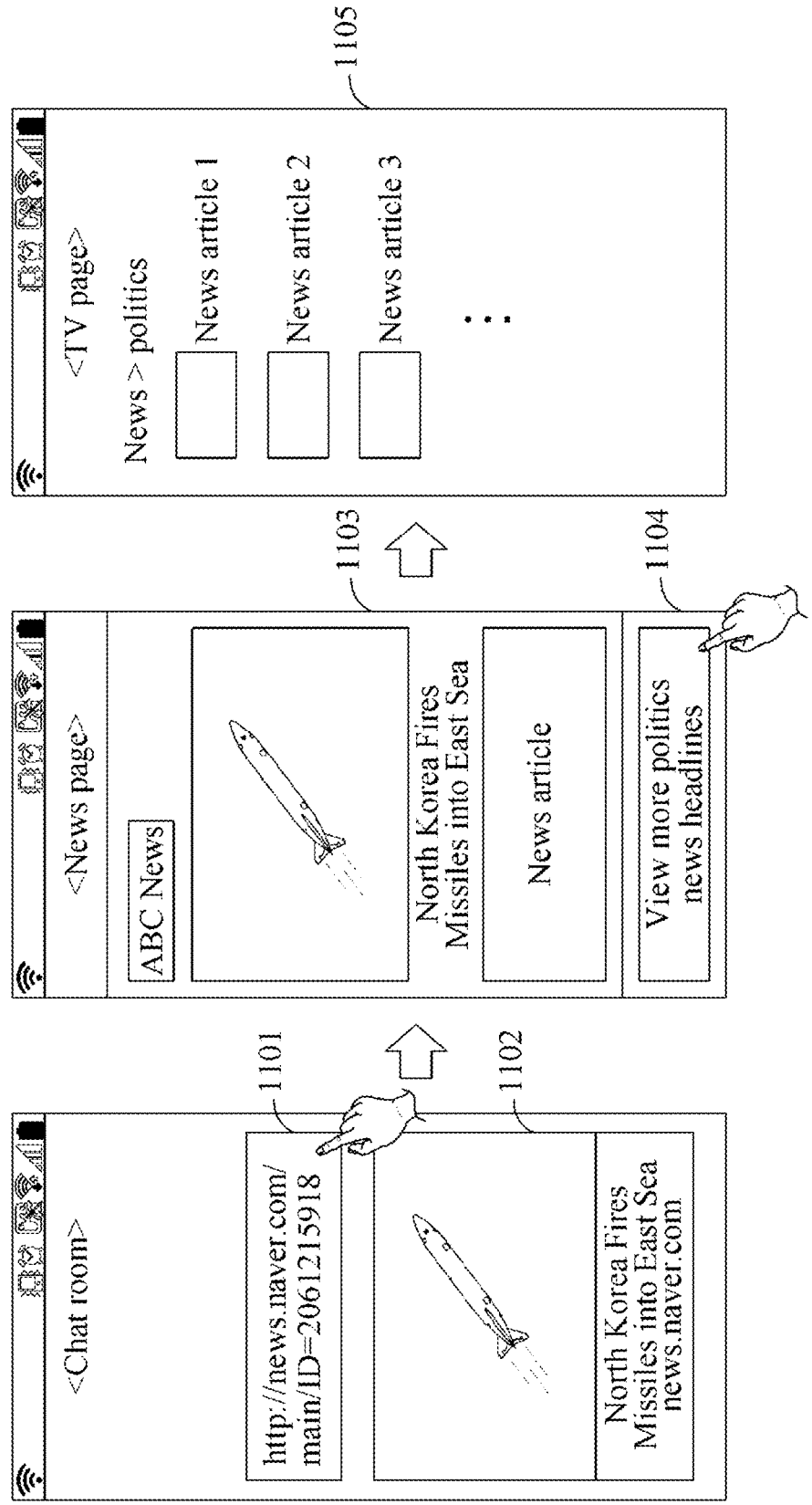
FIG. 11 is a diagram illustrating an example of a method of displaying a widget associated with a news service according to an example embodiment.

FIG. 11 is a diagram illustrating an example of a method of displaying a widget associated with a news service according to an example embodiment.

Referring to a left portion of FIG. 11, link information 1101 may be displayed in a chat room. In addition, summary information 1102 of a content page 1103 corresponding to the link information 1101 may be displayed in lieu of the link information 1101, or the link information 1101 and the summary information 1102 may be displayed together. When a user of a user terminal selects one of the link information 1101 and the summary information 1102 of the content page 1103, the content page 1103 may be displayed as illustrated in a middle portion of FIG. 11.

In FIG. 11, it is assumed that the user selects the link information 1101 associated with news provided by an entity Y different from an entity X providing an instant messaging service. The user terminal may then display, along with the content page 1103, a widget 1104 associated with a news service, which is an extended service providing the news. Here, the news service may refer to an extended service provided by the entity X providing the instant messaging service or another entity being in a cooperative relationship with the entity X.

The user terminal may then display, along with the content page 1103, the widget 1104 including metadata derived from the news corresponding to the link information 1101, for example, a title, details, and a producer of the news, and a category to which the news belongs, and details to induce the user to view another related news or news edited in the news service irrespective of the link information 1101. The widget 1104 may be displayed, in the chat room of a messaging application illustrated in the left portion of FIG. 11, based on a speech bubble or another template different from the speech bubble, separately from the content page 1103.

When the user selects the widget 1104 as illustrated in the middle portion of FIG. 11, a service page 1105 of the news service corresponding to the widget 1104 may be displayed as illustrated in a right portion of FIG. 11. The user may then view other news provided in the service page 1105.

Figure 12:
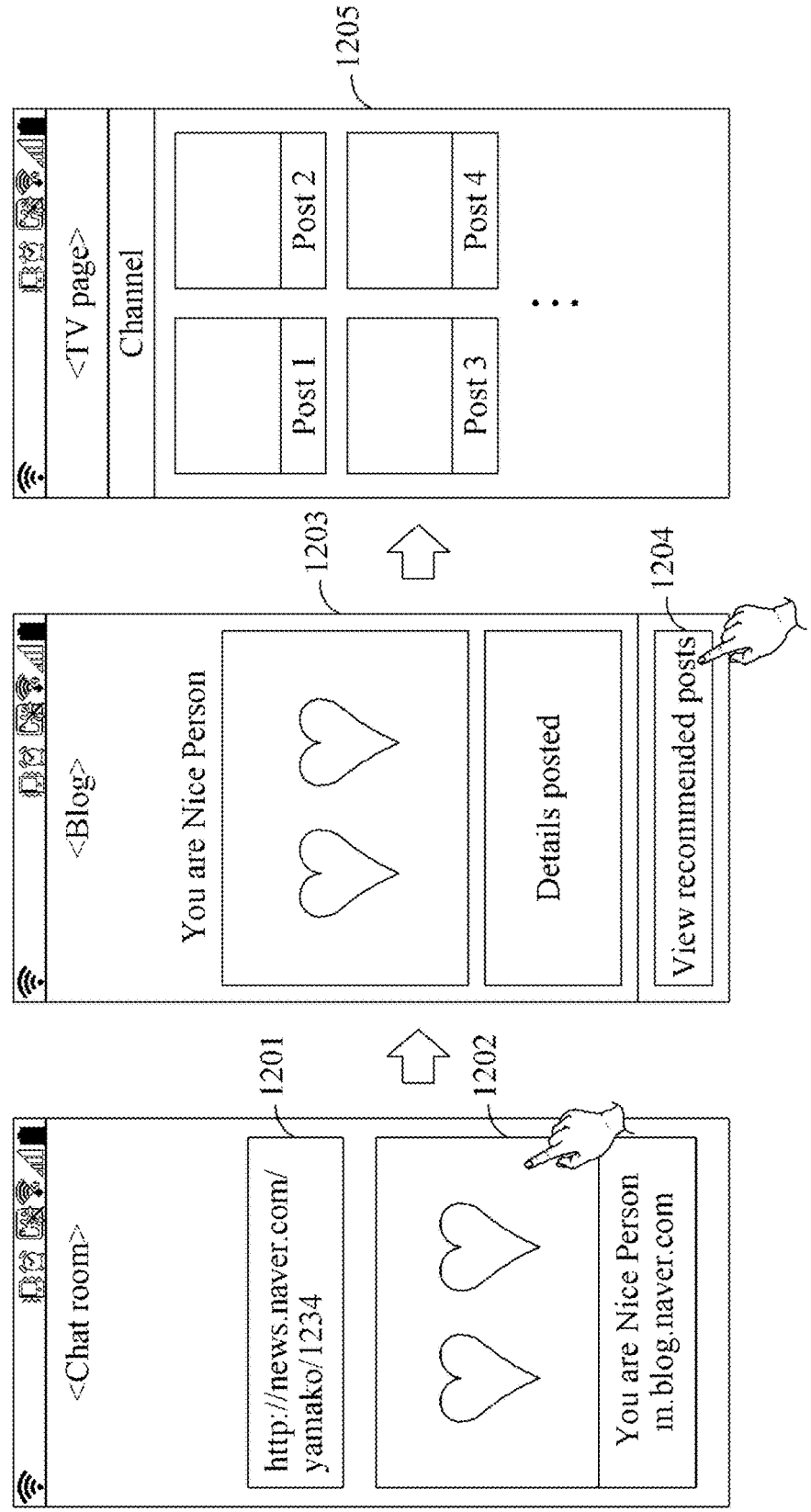
FIG. 12 is a diagram illustrating an example of a method of displaying a widget associated with a topic providing service according to an example embodiment.

FIG. 12 is a diagram illustrating an example of a method of displaying a widget associated with a topic providing service according to an example embodiment.

Referring to a left portion of FIG. 12, link information 1201 may be displayed in a chat room. In addition, summary information 1202 of a content page 1203 corresponding to the link information 1201 may be displayed in lieu of the link information 1201, or the link information 1201 and the summary information 1202 may be displayed together. When a user of a user terminal selects one of the link information 1201 and the summary information 1202 of the content page 1203, the content page 1203 may be displayed as illustrated in a middle portion of FIG. 12.

In FIG. 12, it is assumed that the user selects the link information 1201 associated with a recommendation provided by an entity Y different from an entity X providing an instant messaging service. The user terminal may then display, along with the content page 1203, a widget 1204 associated with a topic providing service, for example, Kakao Channel, which is an extended service providing recommendations. Here, the topic providing service may refer to an extended service provided by the entity X providing the instant messaging service or another entity being in a cooperative relationship with the entity X.

The user terminal may then display, along with the content page 1203, the widget 1204 including metadata derived from the recommendation corresponding to the link information 1201, for example, a title, details, a description, and a producer of the recommendation, and details to induce the user to view another related recommendation or a recommendation edited in the topic providing service irrespective of the link information 1201. The widget 1204 may be displayed, in the chat room of a messaging application illustrated in the left portion of FIG. 12, based on a speech bubble or another template different from the speech bubble, separately from the content page 1203.

When the user selects the widget 1204 as illustrated in the middle portion of FIG. 12, a service page 1205 of the topic providing service corresponding to the widget 1204 may be displayed as illustrated in a right portion of FIG. 12. The user may then view other recommendations provided in the service page 1205.

All the examples illustrated in FIGS. 6 to 12 relate to a case in which link information or summary information of a content page corresponding to the link information is displayed in a chat room. However, example embodiments of the present disclosure also include a case in which the link information or the summary information of the content page is displayed on a certain area of a messaging application in lieu of the chat room. Here, the area may refer to an area for an additional service in addition to a chat service, which is a basic service of the messaging application.

Thus, the example embodiments of the present disclosure may be applicable to all the cases in which a user selects the link information displayed in the chat room of the messaging application or displayed on the area in lieu of the chat room, and accesses the content page using a browser.

In addition, the examples illustrated in FIGS. 6 to 12 describe a case in which, when a user of a user terminal selects a widget, the user terminal may turn to a service page of an extended service corresponding to the widget or a guidance page of an event corresponding to the widget.

However, according to an example embodiment, a server connected to the extended service or the event may perform a corresponding operation or function without the user terminal turning to the service page of the extended service or the guidance page of the event although the user selects the widget.

For example, referring back to FIG. 8, when a 'bookmark' icon displayed on the widget 803 is selected, the service page 804 of the location service, which is an extended service, may not be displayed, but bookmark information associated with a location or a place matching the content page 802 may be transferred to a server connected to the location service and the server may store the bookmark information.

According to an example embodiment, a message server may analyze link information, and identify an extended service suitable for details of the link information. An instant messaging service may then provide a user terminal with the extended service or a service page which a user of the user terminal may access a corresponding service application for the extended service.

Further, the message server may analyze a content page corresponding to the link information, and identify an extended service suitable for details of the content page. The instant messaging service may then provide the user terminal with the extended service or a service page which the user of the user terminal may access a corresponding service application for the extended service.

According to example embodiments described herein, in a case of providing a content page based on link information, displaying a widget which a user may access a separate extended service provided by an entity providing an extended service independent on an instant messaging service or the instant messaging service may induce the user to enter the extended service of the entity.

According to example embodiments described herein, displaying a widget which a user may access an extended service associated with link information or an extended service associated with a content page corresponding to the link information may divert an interest of the user selecting the link information toward the extended service.

According to example embodiments described herein, displaying a widget used to induce a user to an extended service associated with link information or an extended service associated with a content page corresponding to the link information, among separate extended services provided by an entity providing an extended service dependent on an instant messaging service or the instant messaging service, may provide the user selecting the link information with an opportunity to experience the extended service or continuously use the extended service.

According to example embodiments described herein, there is provided a method and device for selectively displaying a widget suitable for a user terminal or a user by setting a priority of a plurality of widgets corresponding to extended services derived from link information or by setting a widget displaying requirement.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of providing a messaging service, the method comprising:
   receiving, by at least one server for the messaging service, a message comprising a link for opening a web page from a computing terminal performing a messaging application;
   identifying, by the at least one server, an entity related to the link by analyzing the link or the web page corresponding to the link;
   generating widget information for use in making a widget configured to provide an access to an event registered by the entity related to the link or an extended service applicable to the entity related to the link; and
   providing the widget information to the computing terminal for displaying the widget along with the web page when the link or a summary information corresponding to the link is selected on the computing terminal.

2. The method of claim 1, wherein the web page is displayed in an in-app browser connected to the messaging application or an out-app browser unrelated to the messaging application.

3. The method of claim 1, wherein when the widget is selected, a service page is provided for an event registered by the entity related to the link or an extended service applicable to the entity related to the link.

4. A method of providing a messaging service, the method comprising:
   transmitting, by a computing terminal, a message comprising a link for opening a web page through a messaging application to a message server;
   receiving, by the computing terminal, widget information for use in making a widget configured to provide an access to an event registered by the entity related to the link or an extended service applicable to the entity related to the link; and
   displaying, on the computing terminal using the widget information, the widget together with the web page when the link or a summary information corresponding to the link is selected,
   wherein the entity is determined based a result of analyzing the link or a content page corresponding to the link.

5. The method of claim 4, wherein the web page is displayed in an in-app browser connected to the messaging application or an out-app browser unrelated to the messaging application.

6. The method of claim 4, further comprising:
   displaying a service page for an event registered by the entity related to the link or an extended service applicable to the entity related to the link, when the widget is selected.

7. A message server comprising one or more processor:
   wherein the message server is configured to:
      receive a message comprising a link for opening a web page from a computing terminal performing a messaging application,
      identify an entity related to the link by analyzing the link or a content page corresponding to the link,
      generate widget information for use in making a widget to provide an access to an event registered by the entity related to the link or an extended service applicable to the entity related to the link, and
      provide the widget information to the computing terminal for displaying the widget along with the web page when the link or a summary information corresponding to the link is selected.

8. A method of operating a messaging system, the method comprising:
   receiving, by at least one server, a first message containing a first Uniform Resource Locator (URL) for opening a first page, wherein the message is from a first user for sending to a second user;
   analyzing, by the at least one server, the first URL contained in the first message or the first page to identify an entity that provides the first page of the first URL;
   subsequent to identifying the entity, searching for and locating, by the at least one server, a service that is offered by the entity; and
   subsequent to locating the service offered by the entity, generating, by the at least one server, widget information for use in making a widget on a terminal of the second user,
   wherein the widget available for the second user comprises a displayable content about the service and a second URL for opening a second page associated with the service or for installing a mobile application associated with the service,
   wherein the widget is available for the second user:
      such that the displayable content about the service is displayed along with the first page on the terminal of the second user when the first URL is selected on the terminal, and
      further such that, when the widget is selected on the terminal, the terminal displays the second page or proceeds for installation of the mobile application.

9. The method of claim 8, wherein the second page comprises an interface for adding the entity as a friend of the second user within the messaging system.

* * * * *